US008006302B2

(12) United States Patent
Abeni

(10) Patent No.: US 8,006,302 B2
(45) Date of Patent: Aug. 23, 2011

(54) METHOD AND SYSTEM FOR DETECTING UNAUTHORIZED USE OF A COMMUNICATION NETWORK

(75) Inventor: Paolo Abeni, Turin (IT)

(73) Assignee: Telecom Italia S.p.A., Milan (IT)

( * ) Notice: Subject to any disclaimer, the term of this patent is extended or adjusted under 35 U.S.C. 154(b) by 1068 days.

(21) Appl. No.: 10/567,752

(22) PCT Filed: Aug. 11, 2003

(86) PCT No.: PCT/IT03/00505
§ 371 (c)(1),
(2), (4) Date: Feb. 10, 2006

(87) PCT Pub. No.: WO2005/015370
PCT Pub. Date: Feb. 17, 2005

(65) Prior Publication Data
US 2006/0242703 A1    Oct. 26, 2006

(51) Int. Cl.
G06F 11/00 (2006.01)
G06F 12/14 (2006.01)
G06F 12/16 (2006.01)
G08G 23/00 (2006.01)
(52) U.S. Cl. .............. 726/23; 726/22; 726/24; 726/25
(58) Field of Classification Search ............... 726/22–25
See application file for complete search history.

(56) References Cited

U.S. PATENT DOCUMENTS

| 5,179,632 | A | 1/1993 | Masui et al. | |
|---|---|---|---|---|
| 5,495,409 | A | 2/1996 | Kanno | |
| 6,477,651 | B1 | 11/2002 | Teal | |
| 6,499,107 | B1 | 12/2002 | Gleichauf et al. | |
| 7,246,376 | B2 * | 7/2007 | Moharram | 726/23 |
| 7,301,899 | B2 * | 11/2007 | Goldstone | 370/230 |
| 7,624,448 | B2 * | 11/2009 | Coffman | 726/23 |
| 7,681,235 | B2 * | 3/2010 | Chesla et al. | 726/23 |
| 2002/0105910 | A1 * | 8/2002 | Maher et al. | 370/235 |
| 2003/0004688 | A1 | 1/2003 | Gupta et al. | |
| 2003/0101353 | A1 * | 5/2003 | Tarquini et al. | 713/200 |
| 2003/0149888 | A1 * | 8/2003 | Yadav | 713/200 |
| 2003/0212910 | A1 * | 11/2003 | Rowland et al. | 713/201 |
| 2004/0015728 | A1 * | 1/2004 | Cole et al. | 713/201 |
| 2004/0073810 | A1 * | 4/2004 | Dettinger et al. | 713/201 |
| 2004/0088583 | A1 * | 5/2004 | Yoon et al. | 713/201 |
| 2004/0255153 | A1 * | 12/2004 | Huynh et al. | 713/201 |
| 2005/0005031 | A1 * | 1/2005 | Gordy et al. | 709/250 |
| 2006/0242703 | A1 * | 10/2006 | Abeni | 726/23 |
| 2007/0214504 | A1 * | 9/2007 | Comparetti et al. | 726/23 |
| 2009/0144823 | A1 * | 6/2009 | Lamastra et al. | 726/22 |

FOREIGN PATENT DOCUMENTS

| EP | 1 330 095 | 7/2003 |
|---|---|---|
| WO | WO 02/45380 | 6/2002 |

* cited by examiner

Primary Examiner — Matthew B Smithers
Assistant Examiner — Jing Sims
(74) Attorney, Agent, or Firm — Finnegan, Henderson, Farabow, Garrett & Dunner, L.L.P.

(57) ABSTRACT

A system for detecting unauthorised use of a network is provided with a pattern matching engine for searching attack signatures into data packets, and with a response analysis engine for detecting response signatures into data packets sent back from an attacked network/computer. When a suspect signature has been detected into a packet, the system enters an alarm status starting a monitoring process on the packets sent back from the potentially attacked network/computer. An alarm is generated only in case the analysis of the response packets produces as well a positive result. Such intrusion detection system is much less prone to false positives and misdiagnosis than a conventional pattern matching intrusion detection system.

25 Claims, 5 Drawing Sheets

METHOD AND SYSTEM FOR DETECTING UNAUTHORIZED USE OF A COMMUNICATION NETWORK

CROSS REFERENCE TO RELATED APPLICATION

This application is a national phase application based on PCT/IT2003/000505, filed Aug. 11, 2003, the content of which is incorporated herein by reference.

FIELD OF THE INVENTION

The present invention refers to a method and a system for intrusion detection in a communication network, and in particular to an intrusion detection system based on pattern matching techniques.

An Intrusion Detection System, or IDS, is a system that is capable of detecting, on a network or a host computer, anomalous or dubious data that may be considered unauthorized and therefore potentially dangerous. Such a system captures and inspects all traffic and, based on the contents, is capable of generating an alarm.

An intrusion detection system operating on a network is generally known as a Network Intrusion Detection System, or NIDS, while an intrusion detection system targeted for the protection of a single machine (e.g. Host, Server) is known as Host Intrusion Detection System, or HIDS. The same techniques used by NIDS systems for detecting anomalous activities are also used by some components of HIDS systems for controlling network activity directed to and from the Host computer.

BACKGROUND ART

A known solution for intrusion detection is the so-called protocol analysis technique. Protocol analysis takes advantage of the known structure of communications protocols for tracking all connections in a protected network. For each connection the system retraces the application level flow and simulates the behaviour of a possible victim. An alarm is generated when the system detects the execution of operations that somehow violate or stress the nature of the used protocol. An intrusion detection system based on the protocol analysis technique is illustrated for example in document US2003/0004688A1. The system illustrated is quite complex, as the protocol analysis technique requires high processing power, moreover, in order to efficiently retrace the behaviour of all protected computers, it is necessary to have an exhaustive knowledge of the protected network.

Statistical analysis is another well-known technique used in intrusion detection systems. Such systems try to detect statistical anomalies, triggering an alarm when a deviation from statistical values is detected. Statistical values may include for example the number of connections simultaneously open, traffic activity to/from a particular computer, or the length in time of connections. While the computing power in such systems is not so critical, it is extremely elaborate to identify which parameters are really symptomatic for determining the status of the network and which kinds of variations are to be detected. An example of intrusion detection system based on statistical analysis is illustrated in document WO 02/45380.

A further technique commonly used in intrusion detection systems is the pattern matching technique, which tries to detect the presence of an attack signature in a network packet. Each packet on the network is searched for various attack signatures (an attack signature is a string or a group of bytes), comparing group of bytes taken from the packet in question with a plurality of known attack signatures.

Depending on the choice of detecting algorithm and the frequency with which it is applied, the pattern matching technique may become a performance bottleneck. The problem of streamlining pattern matching techniques is addressed for example in documents U.S. Pat. No. 5,179,632 and U.S. Pat. No. 5,495,409, which illustrate some methods, not expressly related to network intrusion detection systems, for increasing performances of pattern-matching systems.

An improved intrusion detection system is disclosed in U.S. Pat. No. 6,477,651, which illustrates a system having dynamically loaded signatures. The solution proposed simplifies the modification of the system to adapt to new network vulnerabilities, so that the system supports upgrades in a dynamic manner without shutting down the intrusion detection system.

A further attempt to improve reliability of intrusion detection systems based on pattern matching techniques is illustrated in document U.S. Pat. No. 6,499,107. The method disclosed comprises monitoring network data traffic and analysing such traffic for assessing network information; a plurality of analysis tasks are prioritised based upon the network information, the analysis tasks are performed on the monitored traffic in order to identify attacks upon the network. Each signature has therefore an associated priority value, such value is used by the system for regulating the actuation of the corresponding analysis task.

Such systems identify as an attack any data replicating a known signature, either if it corresponds effectively to an attempt of attacking a vulnerable computer or a service, or if it is directed to a destination that does not exist or that is however not sensitive to that kind of attacks, or even in case the match is caused by legitimate data somehow similar to a known attack signature.

As a consequence, intrusion detection systems based on pattern matching techniques are inclined to generate too many false positives, i.e. false alarm warnings. False positives occur when a byte string in a packet matches a pattern signature, but the string is in fact not an attack at all.

The Applicant has tackled the problem of reducing the number of false positives in an intrusion detection system based on pattern matching techniques.

The Applicant observes that the number of false positives can be sometimes so large that the system itself becomes unserviceable, hiding authentic alarms among thousands of useless warnings.

The Applicant is of the opinion that a conventional pattern matching intrusion detection system has no intelligence to determine the true meaning and the ultimate effect of a detected pattern, thus triggering an excessive number of false positives.

In view of the above, it is an object of the invention to provide an intrusion detection system, based on pattern matching techniques, which is able of filtering alarm warnings for a drastic reduction of false positives.

SUMMARY OF THE INVENTION

According to the invention that object is achieved by means of a method and a system for detecting unauthorised use of a network, which is provided with a pattern matching engine for searching attack signatures into data packets, and with a response analysis engine for detecting response signatures into data packets sent back from the attacked network/computer. When a suspect signature has been detected into a packet, the system enters an alarm status starting a monitoring process on the packets sent back from the potentially attacked network/computer. An alarm is generated only in case the analysis of the response packets produces as well a positive result.

The Applicant has verified that an intrusion detection system realised according to the invention is much less prone to false positives and misdiagnosis than a conventional pattern matching intrusion detection system.

The present invention also relates to a computer program product loadable in the memory of at least one computer and including software code portions for performing the method of the invention when the product is run on a computer.

DETAILED DESCRIPTION OF THE PREFERRED EMBODIMENTS

Figure 1:
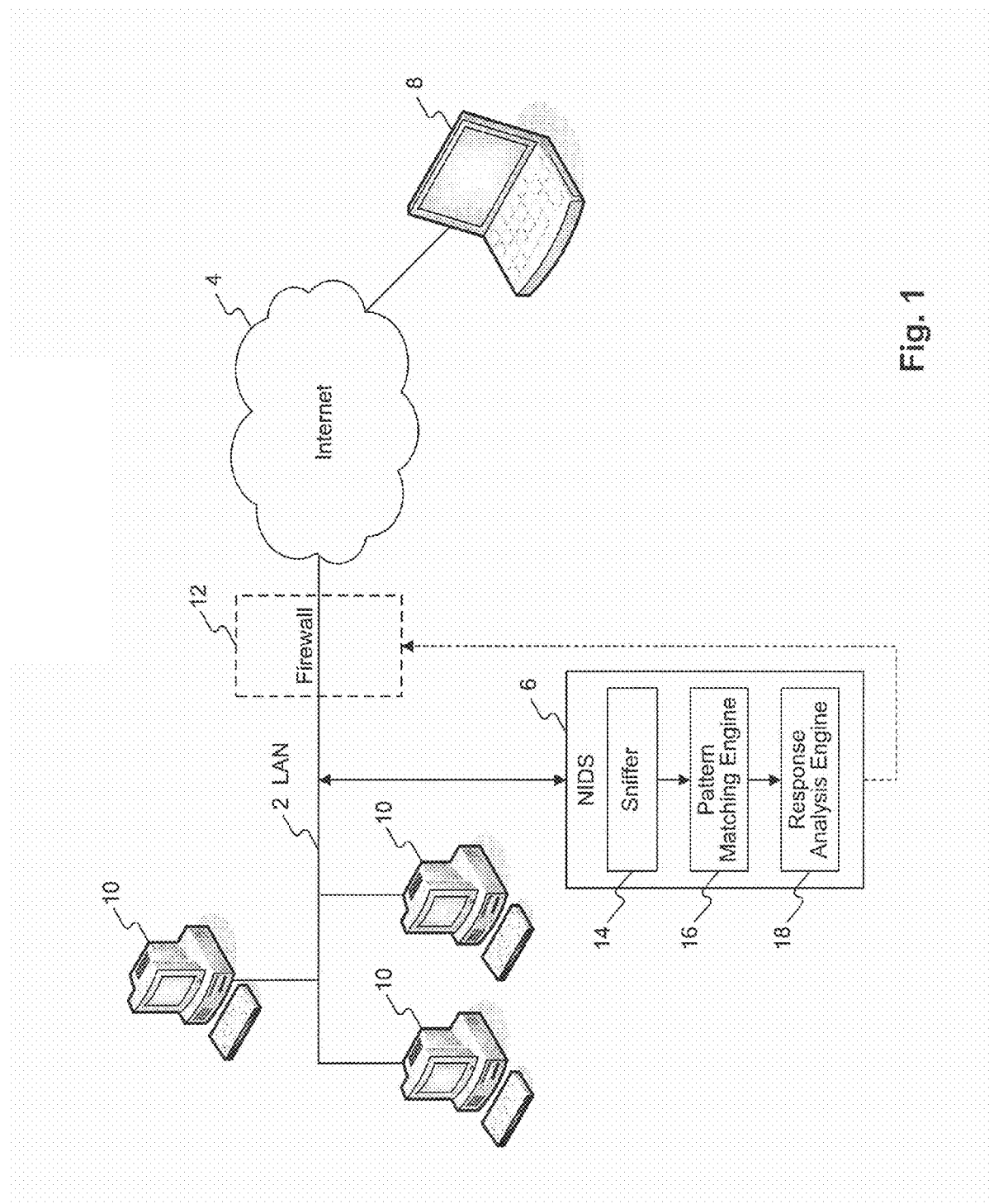
FIG. 1 is a block diagram of a first embodiment of a network environment including an intrusion detection system according to the present invention.

With reference to FIG. 1, a local area network 2 (LAN), protected by a network intrusion detection system 6 (NIDS), is connected to a public network, the Internet network 4, and therefore potentially accessible by an external attacker 8, or Hacker. A plurality of workstations or servers 10 are connected to the local area network 2 for exchanging data and sharing resources, as well as for accessing the Internet network 4.

Between the LAN 2 and the Internet 4, a firewall 12, shown in FIG. 1 with a broken line, can be used for limiting external access to resources in the local area network 2 and protecting such resources from unauthorised use.

The intrusion detection system 6 is coupled to the local area network 2 so that it can detect and capture data being transmitted on the network. The intrusion detection system 6 comprises a sniffer 14 for capturing data on the network 2, a pattern matching engine 16 which receives data captured by the sniffer 14 and a response analysis engine 18 which is triggered by an event generated by the pattern matching engine 16.

A sniffer is a program that monitors network traffic and can be used to capture data being transmitted on a network. Thanks to the sniffer 16, the intrusion detection system 6 is able to read any packet of data passed to the network, for determining the source and destination addresses of the packet and for analysing, as explained in detail hereinbelow, the data content.

Figure 2:
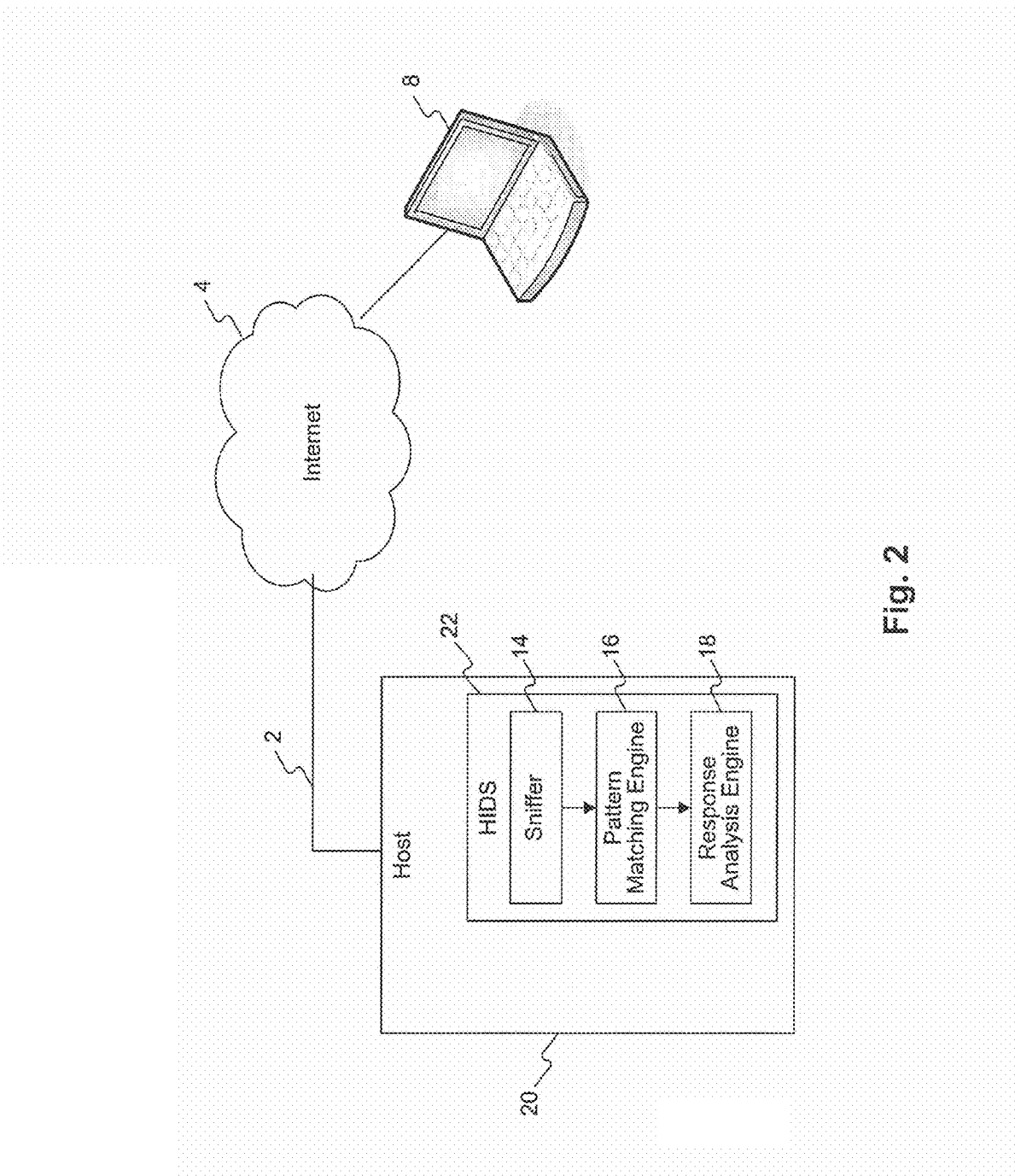
FIG. 2 is a block diagram of a second embodiment of a network environment including an intrusion detection system according to the present invention.

In FIG. 2 is illustrated a second embodiment of a network environment including an intrusion detection system realised according to the present invention. A Host Computer 20, such as a network or a web server, is connected to an Internet network 4, and is therefore accessible by any external computer, such as for example an external attacker 8.

The Host Computer 20 comprises a host intrusion detection system 22 (HIDS), whose operation is equivalent to that of the network intrusion detection system 6 of FIG. 1.

The intrusion detection system 22 comprises a sniffer 14 for capturing data on the network 2, a pattern matching engine 16 which receives data captured by the sniffer 14 and a response analysis engine 18 which is triggered by an event generated by the pattern matching engine 16.

The system 22, in case of danger due to an external attack, intervenes directly on the Host computer 20, protecting its resources from unauthorised use.

Figure 3:
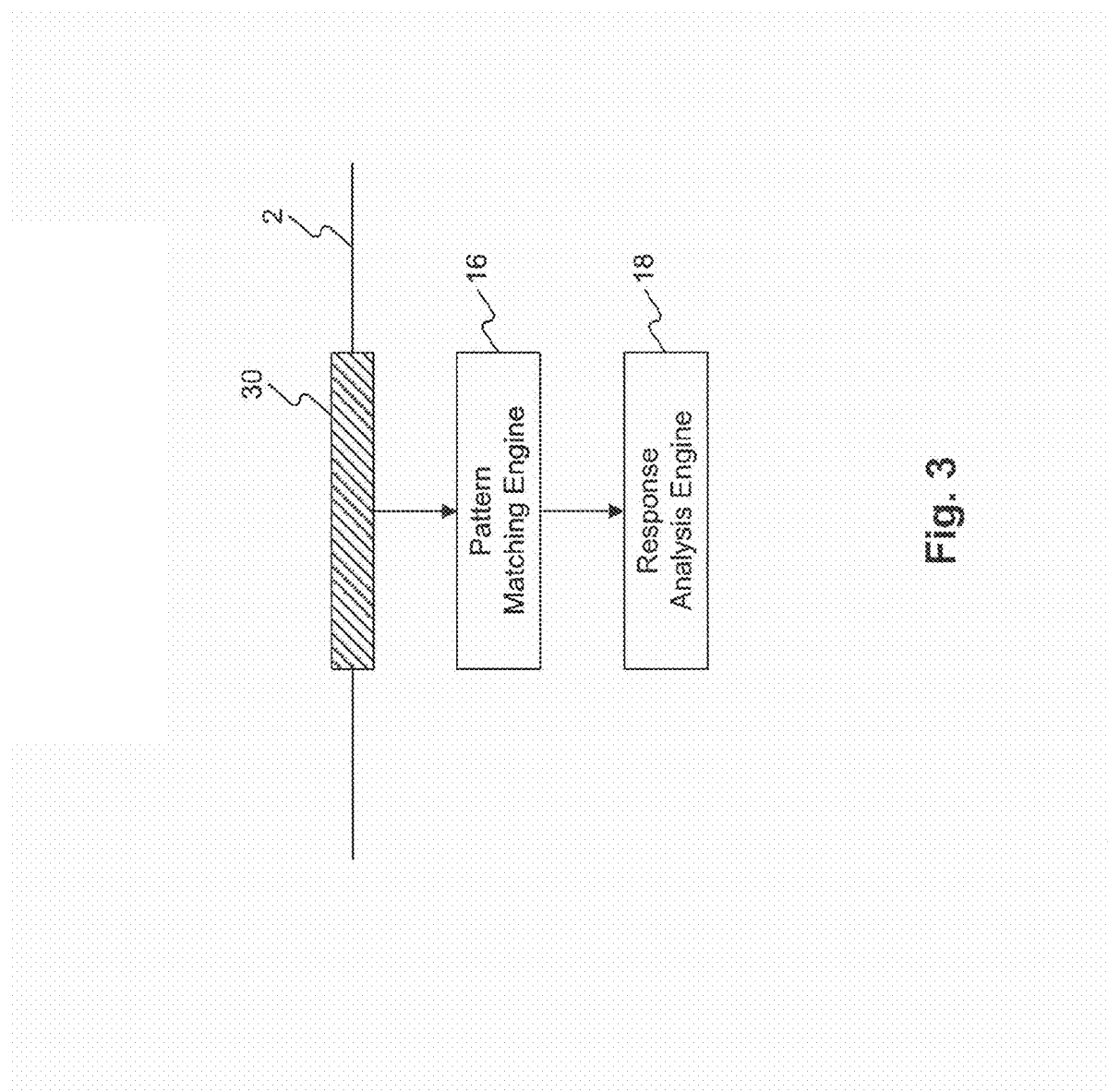
FIG. 3 is a block diagram of an intrusion detection system according to the present invention.

Both the embodiments shown in FIGS. 1 and 2 include an intrusion detection system, NIDS 6 or HIDS 22, which operates according to a common scheme shown in FIG. 3. The sniffer present in the system 6 or 22 captures all data packets transiting in the network 2, e.g. the packet 30 shown in FIG. 3. The captured packet 30 is passed to the pattern matching engine 16, which compares data in the packet with attack signatures, for generating an event when a match between captured data and an attack signature is found. The basic operating principles and criteria of the pattern matching engine 16 are held to be completely known to those of skill in the art (as witnessed e.g. by U.S. Pat. No. 6,477,651 or U.S. Pat. No. 6,499,107).

When a suspect pattern has been identified in a data packet, i.e. the event has been generated by the pattern matching engine 16, a new task is started for analysing particular network traffic. The new task uses the sniffer 14 for capturing data packets that are generated in response to suspect data packets. The term "task" indicates not necessarily a new task or thread, but generally an execution flow running concurrently to the pattern matching engine.

The response packets are selected by performing an analysis of the source IP address (the address of the supposed attacked computer), or by analysing both the source and the destination IP addresses of packets (address of supposed attacked and attacker computers). Alternatively the selection of packets may be performed by analysing transport level information in the same packets (TCP/UDP ports).

In order to determine with greater accuracy the status of the suspected attack in progress, the system is able to send data packets towards both the attacker or the attacked computer, by means of the same sniffer 14. Such packets stimulate an answer in the destination computer, and such answer is analysed by the system, e.g. by means of pattern matching techniques, for determining an alarm status.

The packets captured by the above mentioned new task, i.e. the packets that are generated in response to suspect data packets, are passed to the response analysis engine 18 which compares such data with a collection of response signatures, and for analysing the result of such comparison for generating an alarm.

The response signatures, whose structure is equivalent to the structure of the attack signatures, are collected in a database and are arranged in two categories. "Type A" response signatures identify a suspect, or illicit, traffic, while "type B" response signatures identify non-suspect, or legitimate, traffic. The response signatures, as well as the attack signatures, can be generated manually, thanks to the experience of systems engineers, or, in some cases, automatically, following some simple rules.

Such rules determine the form of the response signatures, as a function of the typology of the considered attack and of the attacked protocol/application. A particular set of response signatures is assigned to each attack signature (or to a group of attack signatures), so that the response signatures used by the response analysis engine 18 depends on the kind of the potential attack revealed.

The following examples illustrate how a set of response signatures can be generated for a particular attack.

The possible attacks must be classified in uniform categories, e.g. DoS (Deny of Service), buffer overflow, directory transversal, etc., and the network protocol used must be known.

For example, in case of a buffer overflow attack, the generated response signature is a type B signature, and recognizes the regular answers of the attacked protocol during normal operation.

In case of a buffer overflow directed to a POP3 Server the response signature is in the form "+OK" or "−ERR", and recognizes a situation in which the suspected attack was not successful.

As a further example, in case of a directory transversal attack, the generated response signature is a type A signature, and recognizes answers indicating a successful attack. The signature generated as a consequence of the execution of a shell command:

"GET/cgi-bin/../../cmd.exe HTTP/1.1"

is

"HTTP1.1 200 OK"

which recognizes effectively an intrusion.

Figure 4:
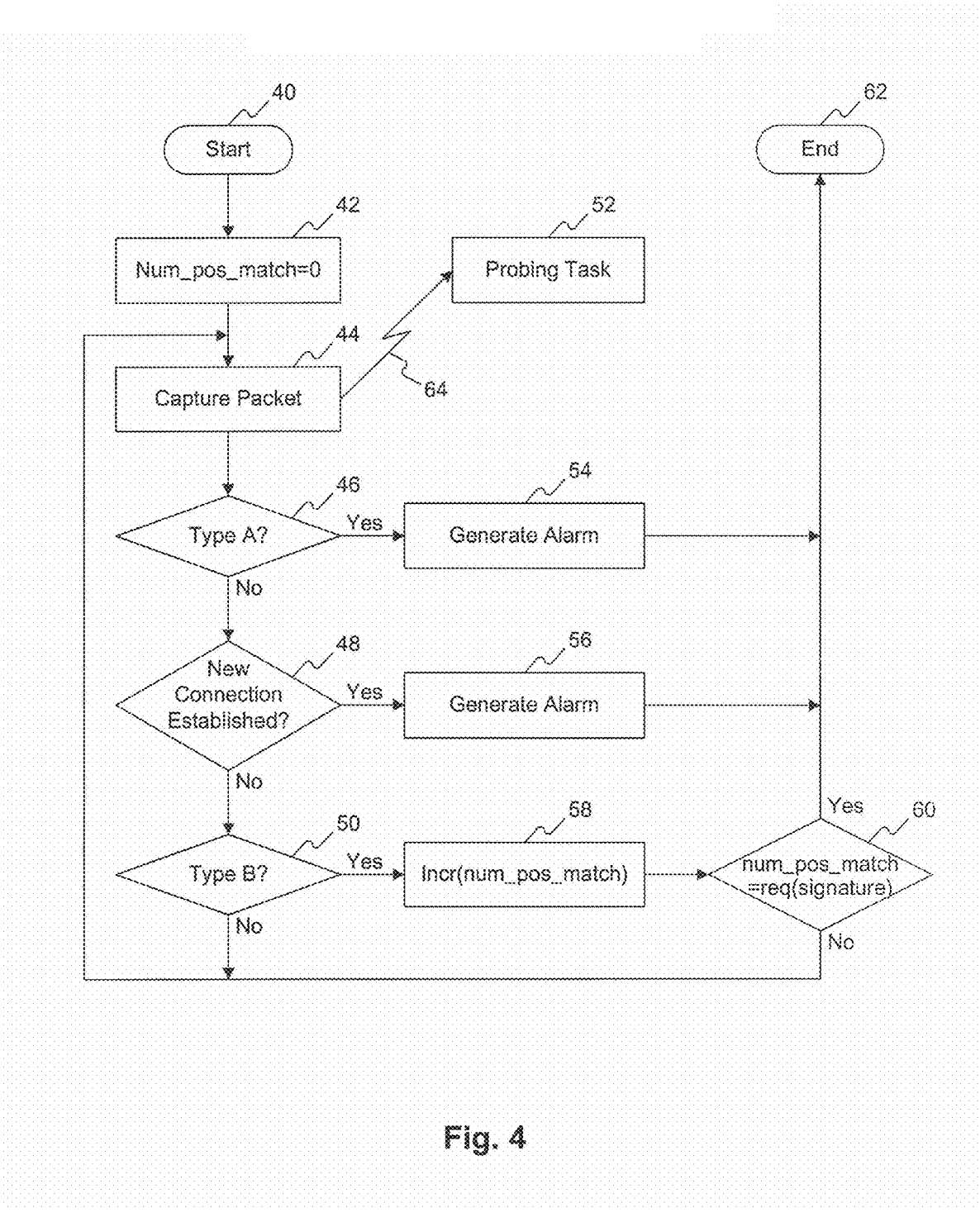
FIG. 4 is a flow diagram of a response analysis process implemented in the system of FIG. 3.

FIG. 4 illustrates in detail the operation of the response analysis engine 18.

The process starts in block 40 when a suspected packet has been individuated by the pattern matching engine 16. The activity is logged in a log file, block 42, for subsequent statistical analysis of data. A variable num_pos_match is initialized (num_pos_match=0) and a timeout 64 is activated.

The system captures a packet coming from the address of the attacked computer and/or directed to the attacker 8, block 44.

The data in the packet is matched with the response signatures corresponding to the attack signature (or signatures) matched. If a matched signature identifies an illicit traffic, type A signature, condition verified in block 46, an alarm is generated in block 54 and the process of the response analysis engine ends, block 62.

If the analysis process captures a packet coming from the attacked computer and directed to the attacker indicating that a new network connection has been established, different from the connection that caused the analysis process, condition verified in block 48, an alarm is generated in block 56 and the process of the response analysis engine ends, block 62. This condition indicates that the attack has been successful and the attacker, having taken control of the victim (attacked computer), has generated a new connection.

If the matched signature identifies a legitimate traffic, type B signature, condition verified in block 50, the revealed situation is not a true attack, or anyway the attack is not effective on the intended target computer, and the variable num_pos_match, representing the number of response packets already analysed, is incremented in block 58 (function Incr(num_pos_match)). In conditional block 60 the variable num_pos_match is compared with a predetermined number of requested signature match (req(signatures)), so that the process can proceed for a predetermined number of packets, jumping back to block 44, or terminating in block 62. The value of the variable req(signature) can be set at will, e.g. according to network administrator preferences.

The iteration of the response analysis process, in case of type B signature match, is performed in order to recognise those situations in which, after a successful attack, the response traffic from the server is temporarily licit, before becoming illicit.

Figure 5:
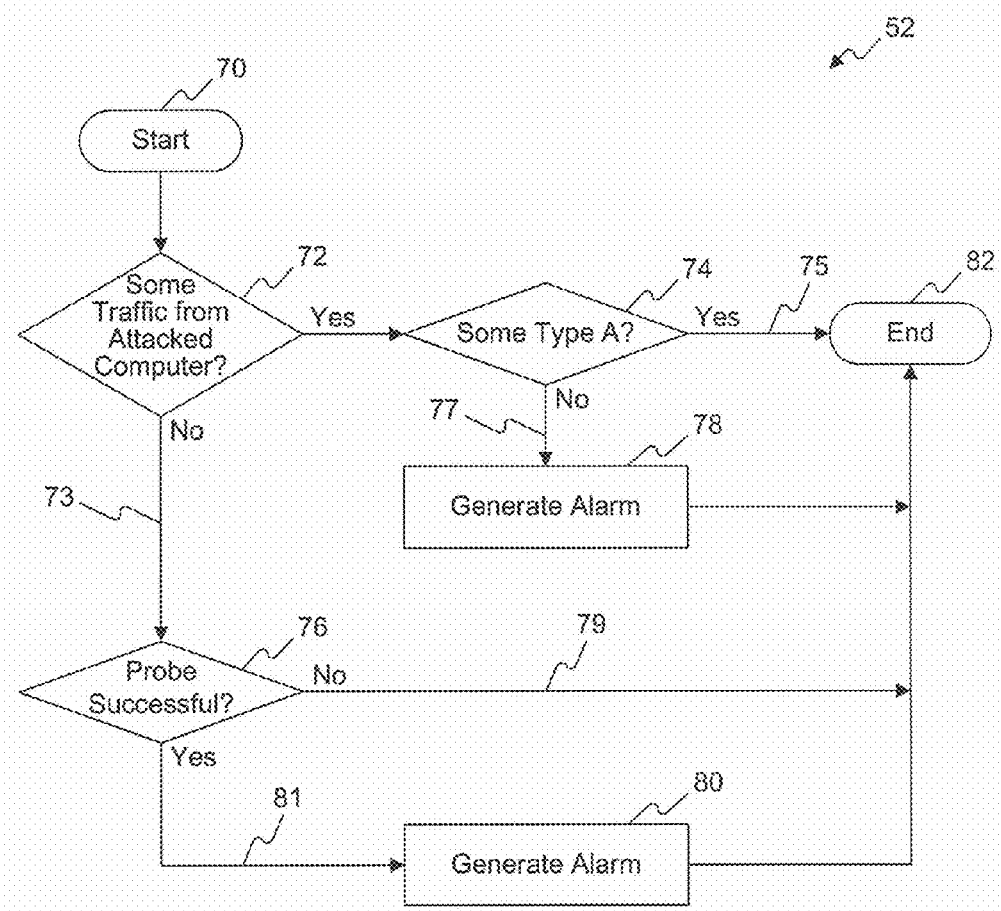
FIG. 5 is a flow diagram of a probing process triggered by the response analysis process of FIG. 4.

The process illustrated in FIG. 4 terminates in block 62 if the timeout 64, activated at the beginning, is not lapsed. On the contrary, at the expire of the timeout 64, a probing task 52 is started, whose operation is illustrated in detail in FIG. 5. The probing task 52 allows the system to decide whether or not an alarm must be generated, in case the response analysis process did not collect enough information for taking that decision.

The probing task, starting in block 70, verifies initially if any traffic from the supposed attacked computer has been detected during the response signatures analysis process, block 72. If some traffic has been detected the execution passes to conditional block 74, wherein the nature of the response signatures that have been previously used is analysed. In case "type A" or both "type A" and "type B" response signatures have been used, arrow 75 in the flow diagram of FIG. 5, the probing task 52 ends without generating any alarm, end block 82. Such situation indicates that, during the analysis process terminated with the expiring of the timeout 64, the response data packets have been compared with signatures indicating illicit traffic (type A) or both kind of signatures (legitimate and illicit), without however any positive match.

Otherwise, in case of "type B" response signatures, arrow 77, an alarm is generated in block 78 and the probing task 52 ends. The latter situation indicates that the response data packets have been compared exclusively with signatures indicating legitimate traffic (type B), such unsuccessful matching condition indicating a potentially danger situation.

If no traffic has been detected between attacked computer and attacker during the response signatures analysis process, arrow 73, a probe of the attacked computer (or application/protocol) is performed in block 76. The probe of block 76 is an attempt to perform a connection to the suspected attacked computer/application/protocol. In case the attempted connection fails, it can be inferred that the attack was oriented to a non-existent target, arrow 79, and the probe task ends without generating any alarm, block 82. On the contrary, arrow 81, if the suspected attacked computer/application/protocol is active, it can be inferred that the attack was successful and, before terminating the task in block 82, an alarm is generated in block 80.

The system is furthermore able to execute contemporaneously more then one response analysis engines, in a multitasking environment, in order to monitor more then one computer/application/protocol at the same time on the same network. The different processes can run simultaneously on the same intrusion detection system, involving different entities or network nodes.

The invention claimed is:

1. An intrusion detection system, for detecting unauthorised use of a network, comprising:
   at least one computer;
   a database storing attack signatures and, for each of the attack signatures, a set of at least one corresponding response signature; and
   a non-transitory computer readable medium encoded with a computer program product loadable into a memory of the at least one computer, the computer program product including:
      instructions for a sniffer for capturing data being transmitted on said network,
      instructions for a pattern matching engine for comparing the captured data with the attack signatures for generating an event when a match between the captured data and at least one attack signature is found, and
instructions for a response analysis engine triggered by said event, for selecting, from the database, a selected set of at least one response signature corresponding to the at least one matched attack signature, and comparing, with the selected set of at least one response signature, response data being transmitted on said network as a response to said captured data and for correlating results of said comparisons with attack and response signatures for generating an alarm.

2. The system of claim 1, wherein said response data is captured by said sniffer by performing an analysis of source IP address in data packets transmitted on said network.

3. The system of claim 1, wherein said response data is captured by said sniffer by performing an analysis of both source and destination IP addresses in data packets transmitted on said network.

4. The system of claim 1, wherein said response data is captured by said sniffer by analysing transport level information in data packets transmitted on said network.

5. The system of claim 1, wherein said response analysis engine generates the alarm when said response data indicates that a new network connection has been established.

6. The system of claim 1, wherein said response signatures are arranged in two categories, response signatures identifying an illicit traffic, and response signatures identifying legitimate traffic.

7. The system of claim 6, wherein said response analysis engine generates the alarm when a match between the response data and a response signature identifying illicit traffic is found.

8. The system of claim 6, wherein said response analysis engine comprises a counter which is incremented when a match between the response data and a response signature identifying legitimate traffic is found.

9. The system of claim 8, wherein, when said counter reaches a predetermined value, said response analysis engine terminates without generating any alarm.

10. The system of claim 1, wherein said response analysis engine comprises a time-out system triggered by said event for starting a probing task.

11. The system of claim 10, wherein said probing task verifies if any data has been detected on said network as the response to said data matched with said at least one attack signature and, if such condition is verified:
  generates the alarm in case only response signatures indicating legitimate traffic have been used by said response analysis engine; or
  ends the probing task in case only response signatures indicating illicit traffic or both response signatures indicating legitimate traffic and illicit traffic have been used by said response analysis engine.

12. The system of claim 11, wherein, if such condition is not verified, said probing task attempts to perform a connection to a suspected attacked computer, for generating the alarm if such attempt is successful, or for ending the probing task if such attempt is unsuccessful.

13. A method performed using one or more computers for detecting unauthorised use of a network, comprising:
  capturing data, using the one or more computers, being transmitted on said network;
  comparing the captured data with attack signatures for generating an event, using the one or more computers, when a match between the captured data and at least one attack signature is found; and
  when triggered by said event:
    selecting, from a database, a selected set of at least one response signature corresponding to the at least one matched attack signature;
    comparing with the selected set of at least one response signature, using the one or more computers, response data being transmitted on said network as a response to said captured data; and
    correlating results of said comparisons, using the one or more computers, with attack and response signatures for generating an alarm.

14. The method of claim 13, wherein said response data is captured by performing an analysis of source IP address in data packets transmitted on said network.

15. The method of claim 13, wherein said response data is captured by performing an analysis of both source and destination IP addresses in data packets transmitted on said network.

16. The method of claim 13, wherein said response data is captured by analysing transport level information in data packets transmitted on said network.

17. The method of claim 13, comprising the step of generating the alarm when said response data indicates that a new network connection has been established.

18. The method of claim 13, wherein said response signatures are arranged in two categories, response signatures identifying illicit traffic, and response signatures identifying legitimate traffic.

19. The method of claim 18, comprising the step of generating the alarm when a match between the response data and a response signature identifying illicit traffic is found.

20. The method of claim 18, comprising the step of incrementing a counter when a match between the response data and a response signature identifying legitimate traffic is found.

21. The method of claim 20, wherein said step of comparing data with response signatures is terminated when said counter reaches a predetermined value.

22. The method of claim 13, comprising the step of providing a time-out system, triggered by said event, for starting a probing task.

23. The method of claim 22, comprising the step of verifying if any data has been detected on said network as a response to said data matched with said at least one attack signature, and, if such condition is verified:
  generating the alarm in case only response signatures indicating legitimate traffic have been used; or
  ending said probing task in case only response signatures indicating illicit traffic or both response signatures indicating legitimate traffic and illicit traffic have been used.

24. The method of claim 23, wherein, if such condition is not verified, said probing task attempts to perform a connection to a suspected attacked computer, for generating the alarm if such attempt is successful, or for ending the probing task if such attempt is unsuccessful.

25. A non-transitory computer readable medium encoded with a computer program product loadable into a memory of at least one computer, the computer program product including software code portions for performing the method of any one of claims 13 to 24.

* * * * *